United States Patent
Bestgen et al.

(10) Patent No.: US 12,486,220 B2
(45) Date of Patent: Dec. 2, 2025

(54) METHOD FOR THE PURIFICATION OF ETHYLENE CYANOHYDRIN

(71) Applicant: Evonik Operations GmbH, Essen (DE)

(72) Inventors: Sebastian Bestgen, Eschborn (DE); Günther Gräff, Bensheim (DE); Maik Caspari, Alsbach-Haehnlein (DE); Thorben Schütz, Alsbach-Haehnlein (DE); Harald Trauthwein, Aschaffenburg (DE)

(73) Assignee: Evonik Operations GmbH, Essen (DE)

( * ) Notice: Subject to any disclaimer, the term of this patent is extended or adjusted under 35 U.S.C. 154(b) by 415 days.

(21) Appl. No.: 18/256,111

(22) PCT Filed: Nov. 8, 2021

(86) PCT No.: PCT/EP2021/080904
§ 371 (c)(1),
(2) Date: Jun. 6, 2023

(87) PCT Pub. No.: WO2022/122273
PCT Pub. Date: Jun. 16, 2022

(65) Prior Publication Data
US 2024/0034715 A1    Feb. 1, 2024

(30) Foreign Application Priority Data
Dec. 8, 2020 (EP) .................... 20212450

(51) Int. Cl.
*C07C 253/34* (2006.01)
*C07C 253/16* (2006.01)
*C07C 255/12* (2006.01)

(52) U.S. Cl.
CPC .......... *C07C 253/34* (2013.01); *C07C 253/16* (2013.01); *C07C 255/12* (2013.01)

(58) Field of Classification Search
CPC .... C07C 253/34; C07C 255/12; C07C 253/16
See application file for complete search history.

(56) References Cited

U.S. PATENT DOCUMENTS

| | | |
|---|---|---|
| 2,364,422 A | 12/1944 | Brooks |
| 2,459,430 A | 1/1949 | Jefts et al. |
| 2,653,162 A | 9/1953 | Luskin |
| 3,395,172 A | 7/1968 | Schweter |
| 4,549,017 A | 10/1985 | McEntire et al. |
| 2009/0163735 A1* | 6/2009 | Schleep ............ C07C 253/16 558/451 |

FOREIGN PATENT DOCUMENTS

| | | |
|---|---|---|
| CN | 1324791 | 12/2001 |
| CN | 109665974 | 4/2019 |
| DE | 1 232 570 | 1/1967 |
| JP | 62-67055 A | 3/1987 |
| JP | 10-59920 A | 3/1998 |
| WO | 2007/144212 | 12/2007 |

OTHER PUBLICATIONS

International Search Report issued Jan. 28, 2022, in PCT/EP2021/080904, 5 pages.
Written Opinion issued Jan. 28, 2022, in PCT/EP2021/080904, 7 pages.

* cited by examiner

*Primary Examiner* — Kamal A Saeed
*Assistant Examiner* — Sagar Patel
(74) *Attorney, Agent, or Firm* — Grüneberg and Myers PLLC

(57) ABSTRACT

A process for purifying ethylene cyanohydrin involves incubating an industrial grade ethylene cyanohydrin product with at least one titanium(IV)alkoxide. Ethylene cyanohydrin products with purities of >99% contain less than 0.05% of ethylene glycol (EG), and/or contain a water content of less than 1000 ppm.

11 Claims, 1 Drawing Sheet

METHOD FOR THE PURIFICATION OF ETHYLENE CYANOHYDRIN

CROSS-REFERENCE TO RELATED APPLICATIONS

This application is the National Stage entry under § 371 of International Application No. PCT/EP2021/080904, filed on Nov. 8, 2021, and which claims the benefit of priority to European Application No. 20212450.9, filed on Dec. 8, 2020. The content of each of these applications is hereby incorporated by reference in its entirety.

BACKGROUND OF THE INVENTION

Field of the Invention

The invention relates to a method for the preparation of high-purity ethylene cyanohydrin.

Description of Related Art

The preparation of ethylene cyanohydrin from ethylene oxide and hydrogen cyanide is well-known in the art. There are various solutions in the prior art for implementing these processes on an industrial scale:

U.S. Pat. No. 2,653,162 describes the production of alkyl cyanohydrin by reacting alkyl oxides with hydrocyanic acid in the presence of a cation exchange resin with alkali metal carboxylate groups as functional group. In a subsequent process step, the cation exchange resin has to be regenerated with great effort.

U.S. Pat. No. 2,364,422 (A) discloses a process for the preparation of alkyl nitriles by reacting tertiary alkyl epoxides with hydrocyanic acid. In an intermediate stage, cyanohydrin is formed, which is immediately hydrated.

In DE 1 232 570 (B), ethylene oxide and liquid hydrocyanic acid are converted to ethylene cyanohydrin in an alkaline medium by pumping in a closed tube circuit and transferring the reaction mixture to a postreactor.

In WO 2007/144212 (A1) ethylene oxide and liquid hydrocyanic acid are converted to ethylene cyanohydrin in an alkaline medium.

CN 109665974 A additionally teaches that in general, the cyanohydrin synthesis requires a certain amount of base to promote the reaction. Cyanohydrin products are often unstable under such conditions. The decomposition products of hydrocyanic acid or some aldehydes are unexpected and unpredictable and can often be observed directly on the deepening of the cyanohydrin product color. In addition, impurities and water introduced in the reaction or carried by the raw materials also aggravate the decomposition and polymerization of the product. In order to ensure the quality of the product and the stable storage requirements for a certain period-of-time, it is necessary to take measures to increase its stability. This is achieved by keeping, handling and storing cyanohydrins under acidic conditions with pH values<7.

Bulk samples of ethylene cyanohydrin from various plants are typically of high purity. Ethylene cyanohydrin of this purity grade is preferably used as a preliminary product in the pharmaceutical and cosmetic industries.

However, even ethylene cyanohydrin described as being of high purity, still contains impurities, especially water and ethylene glycol, which impede its use in very sensitive applications such as medicinal chemistry and synthetic DNA/RNA chemistry.

Ethylene cyanohydrin is, besides other aforementioned applications, commonly used in the synthesis of nucleosides, oligonucleosides, nucleoside phosphoramidites and subsequent utilization in RNA and DNA sequence synthesis. For instance, ethylene cyanohydrin is used to produce Bis(diisopropylamino)(2-cyanoethoxy)phosphine, which is used in the preparation of phosphoramidite reagents, required for synthesis of oligodeoxynucleotides, as phosphorylating agent in the synthesis of 1,2-diacyl-sn-glycero-phosphatidylserine, for the in situ preparation of deoxyribonucleoside phosphoramidites, in the preparation of 2'-deoxy-2'-fluoro-3'-O-(β-cyanoethyl-N,N-diisopropylphosphoramidic)-5'-O-(4-methoxytrityl)-4'-thio-β-D-arabinouridine and 1-(3-O-(β-cyanoethyl-N,N-diisopropylphosphoramidic)-2-deoxy-2-fluoro-5-O-(4,4'-dimethoxytrityl)-4-thio-β-D-arabinofuranosyl)-thymine, and as reagent for synthesizing phosphitylated nucleotides.

Ethylene cyanohydrin is also a crucial raw material for the disubstituted derivative bis(2-cyanoethoxy)-N,N-diisopropylaminophosphine, which is again a useful phosphorylating reagent in oligonucleotide synthesis for adding a terminal phosphate group to the 3' or 5' hydroxyl function. Another derivative based on ethylene cyanohydrin is chloro(diisopropylamino)-(β-cyanoethoxyphosphine, which is employed for selective monophosphorylation of carbohydrates and nucleosides, for conversion of protected ribonucleosides to phosphoramidites, as phosphitylating reagent for 3'-hydroxyl groups in the synthesis of oligodeoxyribonucleotides, and in a scalable, solution-phase oligonucleotide synthesis employing phosphoramidite chemistry and DMT-, iBu- and Bz-protected monomers.

In nucleoside synthesis, the 2-cyanoethyl group is considered a powerful protecting group as well as a modifiable substituent at a phosphorus atom. Generally, phosphites are commonly protected by the 2-cyanoethyl group, which is base-labile. As the 2-cyanoethyl group is introduced via alcoholysis of basic phosphorus-containing precursors and ethylene cyanohydrin, this alcohol is of tremendous industrial importance.

Generally, phosphorus-containing molecules with —$OCH_2CH_2CN$ substituent are obtained either from the reaction of phosphorus-containing precursors with appropriate (basic) leaving group(s) and ethylene cyanohydrin, or from the reaction of phosphorus-containing precursors with other substituents (such as halides: Cl, Br, I), ethylene cyanohydrin and e.g. an acid-scavenger such as an amine. More generally speaking, a phosphorus-containing molecule reacts with ethylene cyanohydrin or its corresponding alcoholate. Obviously, side-reactions can occur if other R—OH or R—O$^-$ containing contaminants are present during the reaction, as they can equally react and bind to the phosphorus atom. Consequences thereof are e.g. contaminated nucleosides, which are not appropriately functionalized and can lead to e.g. defect DNA/RNA structures. Water, methanol, ethanol and ethylene glycol (and their corresponding alcoholates) are of relevance—as they all contain —OH/O$^-$ moieties—and shall be explicitly mentioned here.

Hence, the availability of highly pure ethylene cyanohydrin is significant, especially purity grades which do not contain water and/or ethylene glycol. Only when highly pure ethylene cyanohydrin is synthetically used, an improved synthesis of phosphoramidites and its derivatives is possible. Unfortunately, industrial production processes of ethylene cyanohydrin provide products which contain variable amounts of water and/or ethylene glycol.

The two most prominent ways to synthesize ethylene cyanohydrin are

A) the reaction of ethylene oxide with hydrocyanic acid (HCN)

B) the (catalytic) addition of water to acrylonitrile

Especially in route (B), product contamination with water is obvious, whereas pathway A enables the formation of ethylene glycol from ethylene oxide.

Thus, both variants lead to products with poor impurity profiles. For the above-mentioned applications, significant additional effort for purification and workup is required.

SUMMARY OF THE INVENTION

In view of the above drawbacks it was the objective of the present invention to provide a simple, resource-and cost-efficient process for purifying ethylene cyanohydrin that is applicable to industrial production scales.

This objective is solved by the process according to the present invention. The inventors have unexpectedly found that industrial grade ethylene cyanohydrin (ECH) can be purified in a simple and cost-efficient manner by incubating said industrial grade ECH with at least one titanium(IV) alkoxide.

The term "industrial grade ECH" in the context of the invention refers to commercially available bulk ECH obtained directly from the reaction of ethylene oxide with hydrocyanic acid (HCN), or from the (catalytic) addition of water to acrylonitrile. The term "industrial grade" refers to a product quality suitable for many industrial applications, with a product typically containing minor impurities (ethylene glycol, water) and being less pure than pharmaceutical purity grades.

The term "incubating the industrial grade ECH with at least one titanium(IV) alkoxide" refers to contacting the industrial grade ECH over a certain period of time with the at least one titanium(IV) alkoxide.

In accordance with the above, the invention in a pertains to a process for purifying ECH, the process comprising incubating the industrial grade ECH with at least one titanium(IV) alkoxide.

The process according to the present invention enables—in contrast to the purification methods commonly known in the art, cf. the comparative examples included herein—the production of ECH products in new product quality, i.e. purities.

More specifically, the method according to the present invention enables the production of ECH in purities of >99% and comprising less than 0.05% of ethylene glycol (EG), preferably equal or less than 0.01% and/or comprising a water content of less than 1000 ppm, typically less than 500 ppm.

DETAILED DESCRIPTION OF THE INVENTION

Figure 1:
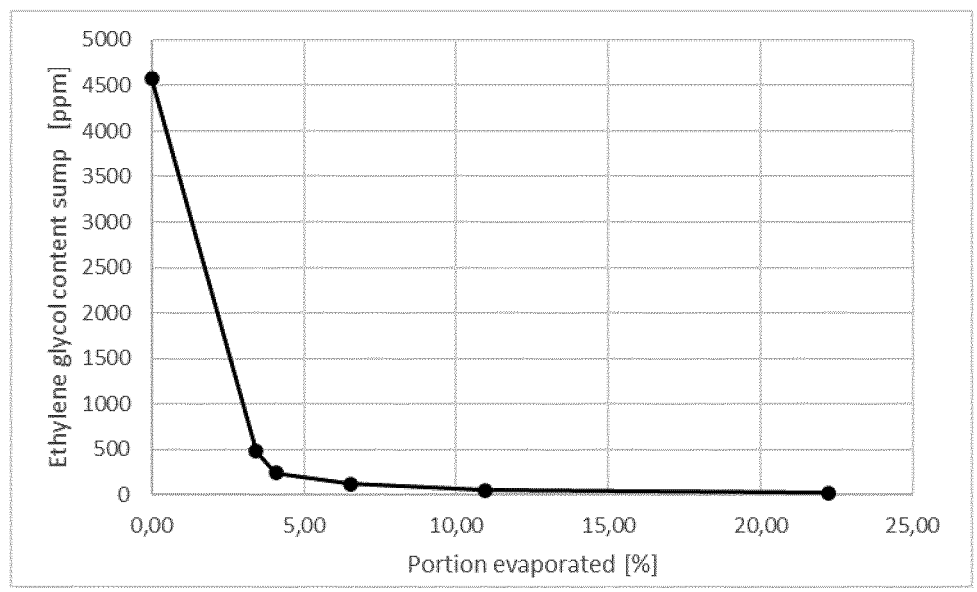
FIG. 1 shows the ethylene glycol content in the sump.

The invention pertains to new processes for producing and/or purifying ECH comprising incubating an industrial grade ECH product with at least one titanium(IV) alkoxide; and to highly-pure ECH products obtainable by such processes.

Titanium(IV) alkoxides are esters of orthotitanic acid $H_4TiO_4$.

Suitable titanium(IV) alkoxides for the process according to the invention are e.g. titanium(IV) alkylalkoxides $Ti(OR)_4$ with $R=C_1-C_{20}$ linear or branched, consisting of e.g $Ti(OMe_4)$, $Ti(OEt_4)$, $Ti(OiPr_4)$, and $Ti(OBu_4)$. $Ti(OiPr_4)$ is particularly preferred.

Advantageously, the titanium(IV) alkoxide used in the incubation step is present in amounts of between 1 wt. % and 15 wt. %, and preferably between 5 wt % and 10 wt. %.

The incubation of the industrial grade ECH with the at least one titanium(IV) alkoxide can preferably take place upon stirring, with the stirring rate particularly preferably being in the range from 50 to 2000 rpm, very particularly preferably in the range from 100 to 500 rpm.

The incubation temperature may be between 20° C. and 70° C., preferably between 25° C. and 50°.

The incubation time depends inter alia on the parameters selected, for example temperature. Generally, the incubation time should be between 0.5 h and 20 h, preferably between 2 h and 18 h. A person skilled in the art can find further information on the reaction times in the examples attached.

The industrial grade ECH may be obtained from the reaction of ethylene oxide with hydrocyanic acid (HCN), or from the (catalytic) addition of water to acrylonitrile.

In order to further increase ECH purity, a distillation step may follow after the incubation with titanium(IV) alkoxide. Distillation can be conducted via multiple techniques, such as using thin-film evaporators, short-poth evaporators, fractional distillation devices with or without columns.

Distillation can be conducted at ambient or elevated temperatures and ambient or reduced pressure, both parameters adjusted to the physical properties of ECH.

With the process of the present invention, ECH can be obtained in a purity of >99% and comprising less than 0.05% of ethylene glycol (EG), preferably comprising less than 0.01% of ethylene glycol (EG). The purity of ethylene cyanohydrin as well as impurities, such as EG content may be measured and quantified via gas chromatography (GC). For example, a gas chromatograph GC6890, 7890 (Agilent) or comparable devices with FID detectors may be used, in combination with quartz capillary columns (DB-FFAP, DB-WAX or other separation phases, 30 m). Helium may used as carrier gas, with injector and detector temperatures of 250° C. Area percent of components are determined (automatically) by area % reporting options of the chromatograph control systems. % are converted to ppm by multiplying with 10000.

In one embodiment of the invention, the ECH has a water content of less than 1000 ppm. A water content of less than 500 ppm is of particular advantage. The water content of ethylene cyanohydrin may be determined via coulometric Karl Fischer titration, or, alternatively, by volumetric titration. A Karl Fischer coulometer (e.g. type 756 from Metrohm) is preferably used together with analytical balances, calibrated syringes and calibrated titration reagents.

Preferably, the ECH has a APHA color value (Pt/Co) of less than 30, preferably less than 5. The color value may be determined photometrically. Therein, the visual comparison with standard color solutions of the platinum-cobalt scale is replaced by measurement of the extinction of the sample at wavelengths 460 and 620 nm. The extinction difference $E_{480\ nm}-E_{620\ nm}\Delta E$ is linearly related to the color unit of the platinum-cobalt standards. Plotting the color value against $\Delta E$ provides a calibration line whose gradient serves as a "factor" for calculation of the color value, but only on the condition that the colorimetric specification for the sample to be analyzed, i.e. its hue, corresponds largely to the platinum-cobalt scale. A spectrophotometer or filter photometer with filters for the ranges 460 and 620 nm is used with 5 cm and 1 cm cuvettes. Calibration substances are potassium hexachloroplatinate ($K_2PtCl_6$), Cobalt(II) chloride hexahydrate ($CoCl_2 \times 6H_2O$) and conc. hydrochloric acid p.a., 32%. Pt/Co standard solutions are prepared and are measured in 5 cm cuvettes at 460 and 620 nm by means of a spectrophotometer or filter photometer with suitable filters. (Reference cuvette contains demineralized water). The Pt/Co color values and the extinction coefficients established for these ($E_{460nm}-E_{620nm}$) show a linear relationship. The gradient of this straight calibration line can be determined graphically or by regression and serves as a basis for calculation of the Pt/Co color value (b and m values).

Pt/Co color value=$((E_{480nm}-E_{620nm})-b)/m$ ($b$=axis intercept, $m$=gradient)

Synonyms for the platinum-cobalt color value are the APHA and Hazen number.

EXAMPLES

Ethylene cyanohydrin was obtained directly from a production plant and used as received. Samples were analyzed via GC/GC-MS (purity), Karl-Fischer titration (water) and Pt/Co scale (APHA, color). Naturally, analytical data from different ECH production batches vary, which is why ranges are given.

| | |
|---|---|
| Ethylene cyanohydrin (%, GC) | 98.5-99.5 |
| Water (ppm, Karl-Fischer) | 200-1000 |
| Ethylene glycol (%, GC) | 0.10-1.00 |
| Color (Pt/Co, APHA) | 20-500 |

Comparative Examples

Attempts to purify ethylene cyanohydrin utilizing common methods known in the art with the requirements of simultaneous reduction of water content, ethylene glycol content, color value and enrichment of ethylene glycol content:

Azeotropic Eistillation with Cosolvents

Removal of water and/or e.g. other polar substances from a reactor via azeotropic distillation is known in the art and was investigated.

Under Dean-Stark conditions, 200 g ethylene cyanohydrin and 250 g toluene were heated to reflux for five hours. Subsequently, the mixture was brought to room temperature and after phase separation, ethylene cyanohydrin was obtained as a yellow liquid.

| | Prior to distillation | After distillation | Reduction (%) or Enrichment (%) |
|---|---|---|---|
| Water (ppm, Karl-Fischer) | 480 | 170 | −64.6 |
| Ethylene glycol (%, GC) | 0.265 | 0.279 | +5.28 |
| Color value (APHA, Pt/Co) | 240 | >500 | + >108 |

Discussion: Via azeotropic distillation with cosolvents, a product is obtained, in which the water content is reduced, while the ethylene glycol is enriched. Simultaneous reduction of water and ethylene glycol content was not achieved. Additionally, the color value increased drastically. Additionally, the co-solvent also has to be distilled of the product.

Absorption

Removal of water and/or e.g. other polar substances from a liquid (or a gas) with porous materials such as molecular sieves is known in the art and was investigated.

100 g ethylene cyanohydrin was mixed with thoroughly dried molecular sieves (4 Å, 10-20 wt. %) and left standing/drying for 10 days. Molecular sieve was removed via filtration.

| | Prior to absorption | After absorption | Reduction (%) or Enrichment (%) |
|---|---|---|---|
| Ethylene cyanohydrin (%, GC) | 99.494 | 99.471 | −0.024 |
| Water (ppm, Karl-Fischer) | 210 | 90 | −57.15 |
| Ethylene glycol (%, GC) | 0.27 | 0.20 | −25.93 |
| Color value (APHA, Pt/Co) | 9 | 22 | +144.4 |

Discussion: Via absorption with molecular sieves, the color value of ethylene cyanohydrin increases. The water content is reduced, and also the ethylene glycol content, but to a lesser extent. Simultaneous reduction of water and ethylene glycol content was achieved, but also the ethylene cyanohydrin content was reduced and the color value increased.

Additionally, the formation of acrylonitrile was observed.

Nota bene: Utilization of a larger amount of molecular sieves is not economical, and would not lead to improved purity and color as shown above.

Distillation 1

Distillation as a purification method is known in the art and was investigated.

Distillation was conducted under various conditions, e.g. between 50° C. and 150° C. and 1 mbar up to 500 mbar negative pressure. A representative sample is given below:

100 g ethylene cyanohydrin was distilled at 130° C.-150° C. at reduced pressure (10 — 30 mbar). 81 g clear colorless distillate was collected together with 18 g of a yellow-red residue.

| | Prior to distillation | After distillation | Reduction (%) or Enrichment (%) |
|---|---|---|---|
| Ethylene cyanohydrin (%, GC) | 99.278 | 99.266 | −0.012 |
| Water (ppm, Karl-Fischer) | 480 | 240 | −50.0 |
| Ethylene glycol (%, 0GC) | 0.265 | 0.411 | +55.09 |
| Color value (APHA, Pt/Co) | 240 | <5 | >−97 |

Discussion: Via distillation, a clear colorless distillate is obtained, thus effectively reducing the color value of ethylene cyanohydrin (removal of colorants via distillation). The water content was reduced, while ethylene glycol enriched in the distillate. Simultaneous reduction of water and ethylene glycol content was not achieved. Additionally, the ethylene cyanohydrin content was reduced.

Distillation 2

A larger sample ethylene cyanohydrin (1.5 kg) was distilled with a column and 20 theoretical plate numbers. The sample was heated with total reflux first, and subsequently different distillate fractions (reflux ratio 2) were collected and analyzed, with intermediate total reflux between each fraction. The column pressure was set to 250 mbar. With each distillate fraction, one additional sump probe was collected.

Observation: During the heating phase, a distinct color change of the sump is observed (from colorless to brown). With progressing distillation time, the color of the mixture increases. Additionally, an unexpectedly large amount of liquids was collected in the cooling trap (23% of the initially applied mass), which was also biphasic The mixture was analyzed and the water content was determined (via Karl Fischer method):

|  | Wt. % Water |  | Mass % |
|---|---|---|---|
| Feed | 0.025 | Trap 1st fraction | 37.1 |
| Sump after 1st fraction | 0.051 | Trap 5th raction | 45.0 |
| Sump at end of distillation | 1.65 | Trap at End | 40.0 |

Obviously, water is formed during the distillation procedure, which enriches (as a low boiler) at the column head. Due to the good stripping effect of water, a large fraction of liquids is collected in the cooling trap. In order to exclude material incompatibility of the distillation apparatus with ethylene cyanohydrin, feed samples were separately heated in vials (>100° C.). A color change as well as an increasing water content (from 250 ppm to 510 ppm,+104%) is observed, which proves decomposition processes under distillation conditions and excludes material incompatibilities.

Furthermore, the distillate as well as the sump was analyzed via GC and GC-MS. Results indicate the formation of new components during the distillation procedure, as peaks arise which were not observed in the starting material.

TABLE 2

Portion ethylene cyanohydrin and ethylene glycol in the sump

|  | Portion evaporated [%] | Ethylene glycol [ppm] | Ethylene cyanohydrin [wt. %] |
|---|---|---|---|
| Feed | 0.00 | 4583 | 98.5258 |
| Fraction 1 | 3.43 | 478 | 99.4258 |
| Fraction 2 | 4.08 | 240 | 99.5121 |
| Fraction 3 | 6.51 | 117 | 99.1834 |
| Fraction 4 | 10.97 | 45 | 98.7654 |
| Fraction 5 | 22.24 | 20 | 96.9994 |

TABLE 3

Portion ethylene cyanohydrin and ethylene glycol in the distillate

|  | Portion evaporated [%] | Ethylene glycol [wt. %] | Ethylene cyanohydrin [wt. %] |
|---|---|---|---|
| Fraction 1 | 3.43 | 9.6908 | 82.2246 |
| Fraction 2 | 4.08 | 5.8213 | 85.8175 |
| Fraction 3 | 6.51 | 1.598 | 89.0743 |
| Fraction 4 | 10.97 | 0.3692 | 89.3493 |
| Fraction 5 | 22.24 | 0.0892 | 89.5579 |

While the ethylene glycol content in the sump decreases (and enriches in the distillate), the ethylene cyanohydrin content decreases as more side reactions take place and side products form. Additionally, the color value of the sump constantly increases. A high purity ethylene cyanohydrin as distillation residue, obtained via evaporation of contaminants, is therefore not possible.

Additionally, the distillate obtained under these conditions shows a significantly decreased ethylene cyanohydrin content. It is also contaminated with ethylene glycol and water, which enrich in the gas phase. Also, as water is constantly formed during temperature exposure of the sump, an anhydrous distillate cannot be obtained.

In summary, continuous distillation of crude ethylene cyanohydrin did not lead to a high pure ethylene cyanohydrin suitable for further reactions in biochemical applications.

Figure 2:
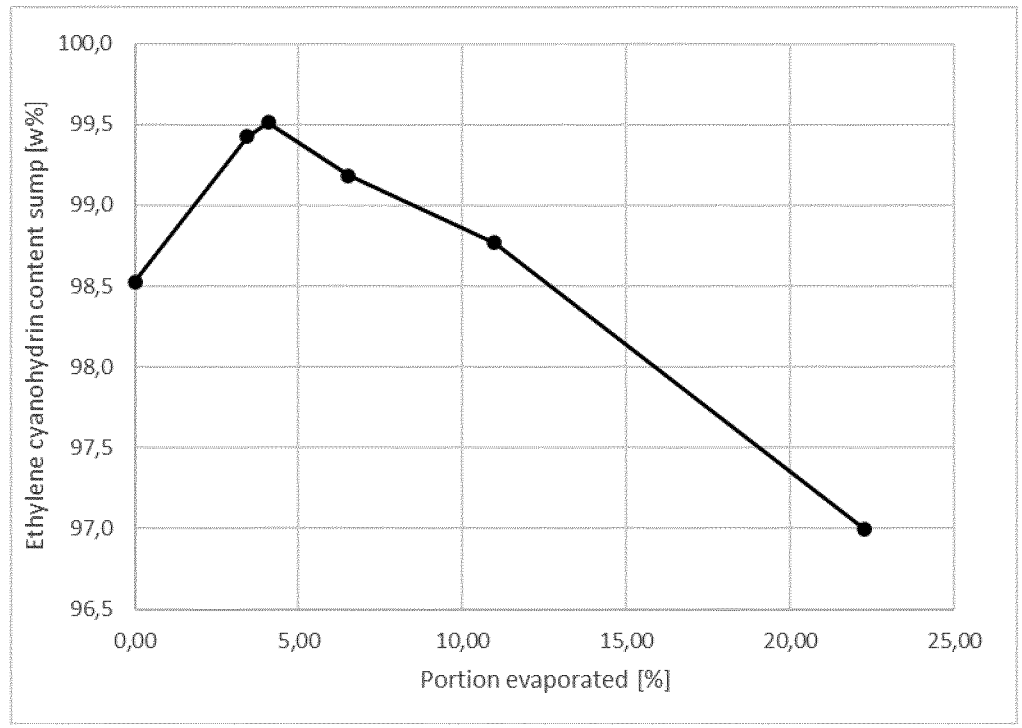
FIG. 2 shows the ethylene cyanohydrin content in the sump.

FIG. 1 shows the ethylene glycol content in the sump.
FIG. 2 shows the ethylene cyanohydrin content in the sump.

COLUMN CHROMATOGRAPHIC PURIFICATION

Column chromatography is known in the art as method to purify chemical substances or to separate chemicals from each other.

Column chromatographic purification of large amounts of liquids (>>100 tons) is uneconomic compared to methods such as distillation. However, chromatographic purification of ethylene cyanohydrin was attempted.

Aluminum oxide: A column was charged with aluminium oxide (90). The column was charged with ethylene cyanohydrin using a feed pump (flow rate 2 mL/min, dwell time ~5 minutes, 25° C.). 650 g crude ethylene cyanohydrin were chromatographed and 16 fractions (each roughly 40 g) were collected and analyzed.

|  | Ethylene cyanohydrin [%] | Ethylene glycol [wt. %] | Water [ppm] | Colour [APHA] |
|---|---|---|---|---|
| Starting Material | 99.47 | 0.26 | 294 | 115 |
| Fraction 4 | 99.36 | 0.27 | 468 | 125 |
| Fraction 7 | 99.40 | 0.27 | 436 | 122 |
| Fraction 10 | 99.40 | 0.28 | 431 | 121 |
| Fraction 13 | 99.42 | 0.28 | 484 | 120 |
| Fraction 16 | 99.42 | 0.28 | 423 | 119 |

Discussion: Via column chromatography, an effective purification of ethylene cyanohydrin was not possible under applied conditions. In all fractions collected, increased water contents as well as an increased color value were observed. Additionally, no effect on the ethylene cyanohydrin and ethylene glycol content was observed.

Tonsil 312 FF: A column was charged with Tonsil 312 FF. The column was charged with ethylene cyanohydrin using a feed pump (flow rate 2 mL/min, dwell time ~3.8 minutes, 25° C.).

Discussion: The column filling compressed/condensed so that no eluate could be obtained. Thus, chromatographic purification of ethylene cyanohydrin using clays as absorbents is not possible.

Molecular sieves (3 Å): A column was charged molecular sieves (3 Å). The column was charged with ethylene cyanohydrin using a feed pump (flow rate 2 mL/min, dwell time ~4.7 minutes, 25° C.). 660 g crude ethylene cyanohydrin were chromatographed and 16 fractions (each roughly 40 g) were collected and analyzed.

|  | Ethylene cyanohydrin [%] | Ethylene glycol [wt. %] | Water [ppm] | Colour [APHA] |
|---|---|---|---|---|
| Starting Material | 99.47 | 0.26 | 294 | 115 |
| Fraction 4 | 99.35 | 0.28 | 422 | 105 |
| Fraction 7 | 99.42 | 0.27 | 522 | 108 |
| Fraction 10 | 99.39 | 0.27 | 508 | 110 |
| Fraction 13 | 99.39 | 0.28 | 521 | 110 |
| Fraction 16 | 99.40 | 0.28 | 549 | 112 |

Discussion: Via column chromatography, an effective purification of ethylene cyanohydrin was not possible under applied conditions. In all fractions collected, increased water contents were observed, while the color value only slightly decreased. Additionally, no effect on the ethylene cyanohydrin and ethylene glycol content was observed. Additionally, the formation of acrylonitrile was observed.

Molecular sieves (4 Å): A column was charged molecular sieves (4 Å). The column was charged with ethylene cyanohydrin using a feed pump (flow rate 2 mL/min, dwell time ~5.3 minutes, 25° C.). 655 g crude ethylene cyanohydrin were chromatographed and 16 fractions (each roughly 40 g) were collected and analyzed.

|  | Ethylene cyanohydrin [%] | Ethylene glycol [wt. %] | Water [ppm] | Colour [APHA] |
|---|---|---|---|---|
| Starting Material | 99.47 | 0.26 | 294 | 115 |
| Fraction 4 | 99.28 | 0.28 | 436 | 108 |
| Fraction 7 | 99.38 | 0.29 | 507 | 111 |
| Fraction 10 | 99.39 | 0.28 | 521 | 114 |
| Fraction 13 | 99.32 | 0.29 | 496 | 115 |
| Fraction 16 | 99.36 | 0.28 | 553 | 113 |

Discussion: Via column chromatography, an effective purification of ethylene cyanohydrin was not possible under applied conditions. In all fractions collected, increased water contents were observed, while the color value only slightly decreased. Additionally, no effect on the ethylene cyanohydrin and ethylene glycol content was observed. Additionally, the formation of acrylonitrile was observed.

Molecular sieves (13×): A column was charged molecular sieves (13×). The column was charged with ethylene cyanohydrin using a feed pump (flow rate 2 mL/min, dwell time ~5.2 minutes, 25° C.). 661 g crude ethylene cyanohydrin were chromatographed and 16 fractions (each roughly 40 g) were collected and analyzed.

|  | Ethylene cyanohydrin [%] | Ethylene glycol [wt. %] | Water [ppm] | Colour [APHA] |
|---|---|---|---|---|
| Starting Material | 99.47 | 0.26 | 294 | 115 |
| Fraction 4 | 99.31 | 0.27 | 596 | 101 |
| Fraction 7 | 99.36 | 0.28 | 600 | 105 |
| Fraction 10 | 99.38 | 0.27 | 585 | 108 |
| Fraction 13 | 99.35 | 0.27 | 605 | 109 |
| Fraction 16 | 97.93 | 0.28 | 635 | 110 |

Discussion: Via column chromatography, an effective purification of ethylene cyanohydrin was not possible under applied conditions. In all fractions collected, increased water contents were observed, while the color value only slightly decreased. Additionally, no effect on the ethylene cyanohydrin and ethylene glycol content was observed. Additionally, the formation of acrylonitrile was observed.

Activated carbon (Epibon Y 12×40 spezial (Donau Carbon)): A column was charged activated carbon. The column was charged with ethylene cyanohydrin using a feed pump (flow rate 2 mL/min, dwell time ~5.4 minutes, 25° C.). 662 g crude ethylene cyanohydrin were chromatographed and 16 fractions (each roughly 40 g) were collected and analyzed.

|  | Ethylene cyanohydrin [%] | Ethylene glycol [wt. %] | Water [ppm] | Colour [APHA] |
|---|---|---|---|---|
| Starting Material | 99.47 | 0.26 | 294 | 115 |
| Fraction 4 | 99.33 | 0.28 | 506 | 71 |
| Fraction 7 | 99.35 | 0.28 | 502 | 82 |
| Fraction 10 | 99.37 | 0.29 | 500 | 90 |
| Fraction 13 | 99.40 | 0.28 | 573 | 94 |
| Fraction 16 | 97.36 | 0.28 | 586 | 95 |

Discussion: Via column chromatography, an effective purification of ethylene cyanohydrin was not possible under applied conditions. In all fractions collected, increased water contents were observed, while the color value only slightly decreased, and only initially. Additionally, no effect on the ethylene cyanohydrin and ethylene glycol content was observed.

Silica gel (Silicagel 60, 0.060-0.2 nm): A column was charged silica gel. The column was charged with ethylene cyanohydrin using a feed pump (flow rate 2 mL/min, dwell time ~3.8 minutes, 25° C.). 655 g crude ethylene cyanohydrin were chromatographed and 16 fractions (each roughly 40 g) were collected and analyzed.

|  | Ethylene cyanohydrin [%] | Ethylene glycol [wt. %] | Water [ppm] | Colour [APHA] |
|---|---|---|---|---|
| Starting Material | 99.47 | 0.26 | 294 | 115 |
| Fraction 4 | 99.37 | 0.28 | 531 | 115 |
| Fraction 7 | 99.38 | 0.28 | 547 | 121 |
| Fraction 10 | 99.42 | 0.28 | 593 | 123 |
| Fraction 13 | 99.40 | 0.28 | 646 | 124 |
| Fraction 16 | 97.36 | 0.28 | 688 | 124 |

Discussion: Via column chromatography, an effective purification of ethylene cyanohydrin was not possible under applied conditions. In all fractions collected, increased water contents were observed, while the color value only slightly decreased, and only initially. Additionally, no effect on the ethylene cyanohydrin and ethylene glycol content was observed. Additionally, the formation of acrylonitrile was observed.

Recrystallisation

Recrystallisation as a method to purify substances is known in the art. However, recrystallisation of liquid ethylene cyanohydrin (mp: −46° C.) in order to purify the substance is not a viable process for obvious reasons.

EXAMPLES ACCORDING TO THE PRESENT INVENTION

Purification of ECH by Addition of Titanium(IV) Alkoxides

Esters of orthotitanic acid $H_4TiO_4$, such as $Ti(OR_4)$ (R=Me, Et, iPr, Bu, 2-Ethylhexyl, neopentyl etc.) are stirred with ethylene cyanohydrin for two hours at ambient conditions.

Example 1a

A 100 g industrial grade ethylene cyanohydrin sample was mixed with $Ti(O/Pr)_4$ (5 g, 5 wt.-%) and stirred for two hours at 25° C.

|  | Prior to $Ti(OiPr)_4$ addition | After $Ti(OiPr)_4$ addition | Reduction (%) |
|---|---|---|---|
| Water (ppm, Karl-Fischer) | 500 | 260 | −48.0 |
| Ethylene glycol (%, GC) | 0.30 | 0.096 | −68.0 |

Example 1b

A 100 g industrial grade ethylene cyanohydrin sample was mixed with $Ti(OMe)_4$ (5 g, 5 wt.-%) and stirred for three hours at 50° C.

|  | Prior to $Ti(OMe)_4$ addition | After $Ti(OMe)_4$ addition | Reduction (%) |
|---|---|---|---|
| Ethylene glycol (%, GC) | 0.30 | 0.082 | −72.6 |

Example 2

A 20 g industrial grade ethylene cyanohydrin sample was mixed with $Ti(O/Pr)_4$ (2 g, 10 wt.-%) and stirred for 18 hours at 25° C.

|  | Prior to $Ti(OiPr)_4$ addition | After $Ti(OiPr)_4$ addition | Reduction (%) |
|---|---|---|---|
| Water (ppm, Karl-Fischer) | 500 | 330 | −34.0 |
| Ethylene glycol (%, GC) | 0.30 | 0.029 | −90.3 |

Example 3

A 537 g industrial grade ethylene cyanohydrin sample was mixed with $Ti(O/Pr)_4$ (50 g, 10 wt.-%) and stirred for 18 hours at 25° C. Subsequently, the mixture was evaporated using a rotary evaporator. First, at temperatures between 25° C. and 150° C. and at a pressure range between 20 mbar and 60 mbar, a foreshot is collected (15 wt. %). At 150° C. at a pressure range between 10 mbar and 20 mbar, the main fraction is collected (65 wt. %). The residue (20 wt. %) is kept.

|  | Initial | After $Ti(OiPr)_4$ addition | After distillation: Foreshot | After distillation: Main fraction | Reduction (%) or Enrichment (%) |
|---|---|---|---|---|---|
| Water (ppm, Karl-Fischer) | 300 | 430 | 2600 | 210 | −30 |
| Ethylene glycol (%, GC) | 0.30 | 0.045 | 0.014 | 0.027 | −91.0 |
| Ethylene cyanohydrin (%, GC) | 99.2 | 85.75 | 36.84 | 99.50 | +0.30 |

Example 4

A 516.5 g industrial grade ethylene cyanohydrin sample was mixed with $Ti(O/Pr)_4$ (51.7 g, 10 wt.-%), heated to 50° C. and stirred for 4 h-20 h. Subsequently, the mixture is fractionally distilled at elevated temperature (50° C. to 140° C., mostly between 90° C. and 130° C.) under vacuum (500 mbar to 1 mbar, mostly between 20 mbar and 5 mbar). The overall distillation yield of ethylene cyanohydrin is >90° C., typically >95%.

In order to ensure long-term stability of the distillate, the pH value of the product must be acidic and therefore below 7.

|  | Initial | After distillation: Relevant fraction | Reduction (%) or Enrichment (%) |
|---|---|---|---|
| Water (ppm, Karl-Fischer) | 423 | 416 | −2 |
| Ethylene glycol (%, GC) | 0.34 | <0.01 | >>−95.0 |
| Ethylene cyanohydrin (%, GC) | 99.39 | 99.60 | +0.22 |
| Color value (APHA, Pt/Co) | 88 | <5 | >>−90.0 |

In contrast to all previous attempts, ethylene cyanohydrin was obtained with decreased ethylene glycol and water content, while coincidently increasing the ethylene cyanohydrin content and decreasing the colour value.

The invention claimed is:

1. A process for purifying ethylene cyanobydrin (ECH), the process comprising:
    incubating industrial grade ethylene cyanohydrin with at least one titanium (IV) alkoxide.
2. The process according to claim 1, wherein the at least one titanium (IV) alkoxide in the incubation is present in amounts of between 1 wt. % and 15 wt. %.
3. The process according to claim 1, wherein the at least one titanium (IV) alkoxide is at least one titanium (IV) alkylalkoxide $Ti(OR)_4$, wherein R=$C_1$-$C_{20}$ linear or branched alkyl.
4. The process according to claim 1, wherein the titanium (IV) alkoxide is $Ti(OiPr)_4$.
5. The process according to claim 1, wherein the incubation is performed under stirring at a temperature of between 20° C. and 70° C.
6. The process according to claim 1, wherein the incubation is performed under stirring at a temperature of between 25° C. and 50° C.

7. The process according to claim 1, wherein an incubation time is between 0.5 h and 20 h.

8. The process according to claim 1, wherein the industrial grade ethylene cyanohydrin is obtained by reacting ethylene oxide with hydrocyanic acid (HCN).

9. The process according to claim 1, wherein the industrial grade ethylene cyanohydrin is obtained by catalytic addition of water to acrylonitrile.

10. The process according to claim 1, further comprising distillation.

11. The process according to claim 3, wherein the at least one titanium (IV) alkoxide is $Ti(OMe)_4$, $Ti(OEt)_4$, $Ti(OiPr)_4$, or $Ti(OBu)_4$.

* * * * *